United States Patent Office

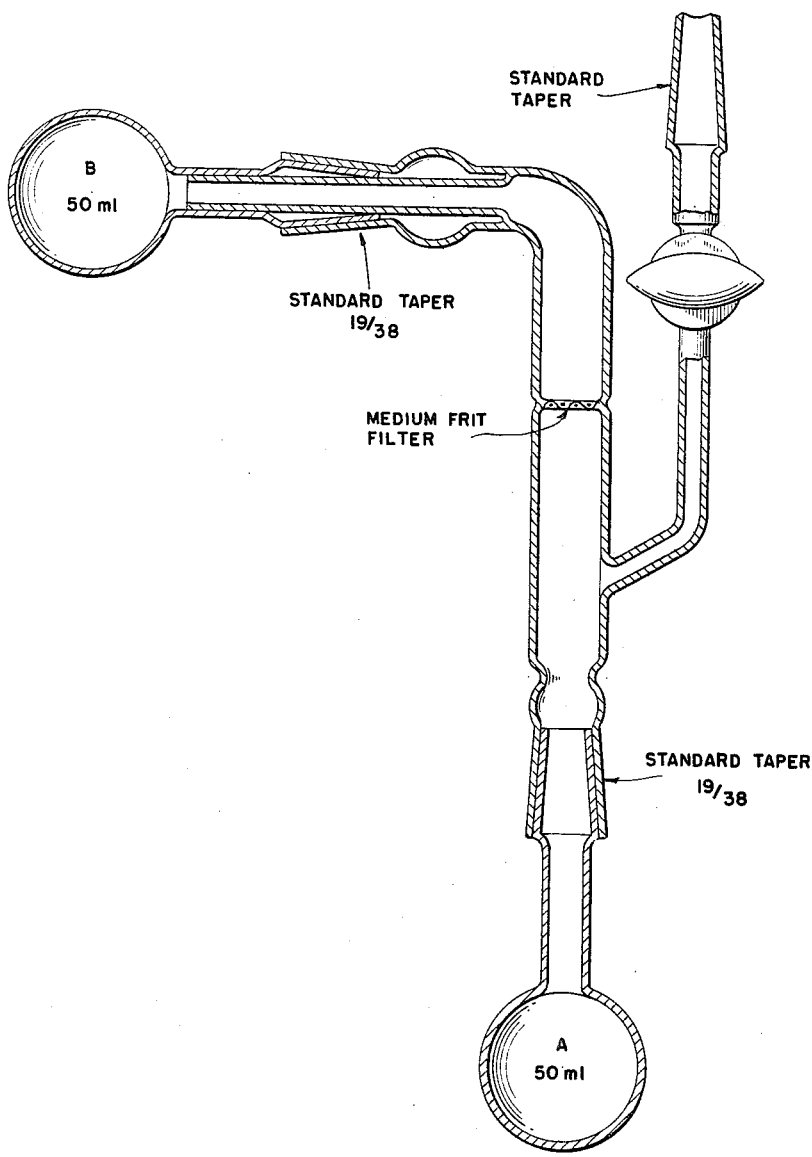

2,921,833
Patented Jan. 19, 1960

2,921,833

SODIUM DECABORANE AND METHOD FOR ITS PREPARATION

Richard H. Toeniskoetter, Cleveland, Ohio, and George W. Schaeffer, Creve Coeur, Mo., assignors, by mesne assignments, to Olin Mathieson Chemical Corporation, a corporation of Virginia Application November 13, 1957, Serial No. 696,286

2 Claims. (Cl. 23—14)

This invention relates to the preparation of the new compound, sodium decaborane, $Na_2B_{10}H_{14}$, and more in particular it relates to the preparation of sodium decaborane by the direct reaction of two moles of sodium with one mole of decaborane while they are dissolved in liquid ammonia. The reaction is generally conducted at a temperature of from minus 60° C. to plus 40° C., elevated pressures being used when needed to keep the ammonia in liquid phase. This reaction is expressed by the equation: $2Na + B_{10}H_{14} \rightarrow Na_2B_{10}H_{14}$.

The compound $Na_2B_{10}H_{14}$ is a white non-volatile hygroscopic solid which is stable below 120° C. but decomposes slowly between 120° and 190° C. without other visible change. It is soluble in ammonia and tetrahydrofuran without alteration and in water and methanol with decomposition. It is insoluble in diethylether and solvents of low polarity. Its aqueous and methanol solution slowly liberate hydrogen, and from aqueous medium at least part of the decaborane can be recovered by acidification if the hydrolysis has not progressed too far. The solution of sodium decaborane in tetrahydrofuran is colorless and is stable indefinitely. Tensiometric and cryoscopic molecular weight determinations in liquid ammonia as well as elemental analysis are in accord with the formula $Na_2B_{10}H_{14}$. The compound exhibits the unique X-ray diffraction spectra shown in Table I.

Sodium decaborane can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. Sodium decaborane when incorporated with oxidizers is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following examples illustrate the invention. In the examples, the term "moles" signifies gram moles.

EXAMPLE I

The apparatus of the accompanying drawing was attached to a vacuum line, thoroughly evacuated and flushed with dry, oxygen-free nitrogen. Decaborane, 3.49 millimoles, was transferred to the reactor (Bulb A). After the apparatus was re-evacuated and flushed with nitrogen, 12.10 millimoles of sodium were also transferred to the reactor. The apparatus was once again evacuated and a quantity of dry ammonia, sufficient to give about 10 milliliters of liquid solvent, was condensed into the reactor at —196° C. The contents were warmed to —45° C. and agitated by gentle shaking for a few minutes as soon as the ammonia liquefied. The temperature was maintained at —45° C. for 60 minutes to insure complete reaction.

The reactor was then cooled to —196° C. and 0.107 millimole of hydrogen or 0.031 millimole of hydrogen per millimole of decaborane was recovered. After the recovery of the hydrogen, the —196° C. bath was removed from around the reactor to allow evaporation of the ammonia. The vapor tension of the ammonia (403 mm. of mercury at —45.2° C., literature 403 mm.) showed it to be pure. After the removal of the ammonia the reactor was again cooled to —196° C. and about 10 milliliters of dry tetrahydrofuran were condensed on the residue. Upon warming to room temperature the solution was filtered. Finally, the tetrahydrofuran was distilled from the flask. After evaporating the solvent from the filtrate, 0.645 g. (theoretical 0.588 g.) of $Na_2B_{10}H_{14}$ was obtained.

The metallic-appearing, tetrahydrofuran-insoluble residue retained on the filter dissolved in methanol and the hydrogen produced was equivalent to 4.92 millimoles of free sodium. Therefore, 12.10—4.92=7.18 millimoles of sodium or 2.05 millimoles per millimole of decaborane had reacted. The methanol was distilled and found to contain only 0.04 millimole of boron, showing that the tetrahydrofuran-insoluble material contained no boron compound. The sodium-containing residue was then dissolved in dilute sulfuric acid, evaporated to dryness and ignited. From the amount of this residue (0.3605 g. as $Na_2SO_4$), a sodium content of 5.07 millimoles was calculated. Agreement between this analysis and the preceding protolytic results identifies the tetrahydrofuran-insoluble material obtained in the reaction as metallic sodium and confirms the equation $$2Na + B_{10}H_{14} \rightarrow Na_2B_{10}H_{14}$$

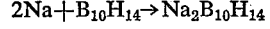

Elemental analysis of weighed samples of the reaction product recovered from the tetrahydrofuran gave: Na, 24.8 percent; B, 62.5 percent; H, 7.85 percent. Calc. for $Na_2B_{10}H_{14}$: Na, 27.3 percent; B, 64.3 percent; H, 8.34 percent. The elementary ratio calculated from this analysis is $Na_{1.9}B_{10}H_{13.4}$. Nitrogen analysis on the products of other preparations indicated a nitrogen content of less than 0.10 percent. The slightly low analytical results and the somewhat high material balance can be attributed to solvolysis or hydrolysis of the material during handling.

Cryoscopic and tensiometric molecular weight measurements of the product in ammonia were in accord with the monomeric formula: cryoscopic, 163±6; tensiometric, 159±6, formula weight, 168.3. The compound exhibits a unique X-ray diffraction spectrum as shown in Table I. No lines were observed which could be attributed to other possible sodium-hydrogen-boron compounds (NaH, $NaBH_4$ etc.).

Other reactions conducted under similar conditions are summarized in Tables II and III.

Table I

X-RAY DIFFRACTION DATA FOR $Na_2B_{10}H_{14}$

| θ Degrees | d (A.) | Relative Intensity | θ Degrees | d (A.) | Relative Intensity |
|---|---|---|---|---|---|
| 7.89 | 5.66 | very strong | 18.71 | 2.54 | weak. |
| 11.98 | 3.77 | strong | 19.48 | 2.44 | very weak. |
| 13.59 | 3.37 | very weak | 20.57 | 2.34 | medium. |
| 15.94 | 2.92 | medium | 21.12 | 2.30 | Do. |
| 16.78 | 2.79 | do | 22.31 | 2.19 | weak. |
| 17.35 | 2.70 | very weak | 23.13 | 2.13 | very weak. |
| 18.07 | 2.61 | weak | 23.82 | 2.08 | weak. |

Table II

| Example | Reactants | | Color of Ammonia Solution | Unreacted Na, mmoles [1] | Na reacted/ $B_{10}H_{14}$ | $H_2$ obtained, mmoles | $NH_3$ retained, mmoles |
|---|---|---|---|---|---|---|---|
| | Na, mmoles | $B_{10}H_{14}$, mmoles | | | | | |
| 2 | 5.08 | 2.09 | blue | 0.854 | 2.03 | 0.140 | 0.151 |
| 3 | 9.13 | 3.97 | do | 0.823 | 2.09 | 0.520 | 0.505 |
| 4 | 3.81 | 1.77 | do | 0.312 | 1.99 | 0.069 | 0.063 |
| 5 | 5.40 | 2.72 | colorless | Nil | 1.98 | 0.237 | 0.263 |
| 6 | 4.76 | 2.41 | do | Nil | 1.97 | 0.044 | 0.069 |

[1] By dissolving in MeOH.

Table III

| Example | Reactants | | Color of Ammonia Solution | Unreacted Na, mmoles [1] | Na reacted/ $B_{10}H_{14}$ | $H_2$ obtained, mmoles | $H_2/B_{10}H_{14}$ |
|---|---|---|---|---|---|---|---|
| | Na, mmoles | $B_{10}H_{14}$, mmoles | | | | | |
| 7 | 4.13 | 4.03 | colorless | Nil | 0.98 | 0.054 | 0.013 |
| 8 | 4.76 | 2.41 | do | Nil | 1.97 | 0.044 | 0.018 |
| 9 | 3.81 | 1.77 | blue | 0.312 | 1.99 | 0.069 | 0.039 |

[1] By dissolving in MeOH.

When decaborane and an excess of sodium are brought together rapidly in liquid ammonia, two gram atoms of sodium are consumed for each gram mole of decaborane. If less than two gram atoms of sodium for each gram mole of decaborane are employed, the sodium reacts completely and a substantial part of the unreacted decaborane can be recovered. No volatile substances, other than trace amounts of hydrogen as noted below, are produced and the reaction can be adequately described by the equation: $2Na + B_{10}H_{14} \rightarrow Na_2B_{10}H_{14}$.

Under certain conditions, minor deviations from the stoichiometry of the equation are observed. If the reactants are slowly brought together, a small quantity of hydrogen is produced and an equivalent amount of ammonia is retained by the products. The hydrogen-producing reaction can be minimized to less than 0.5 percent of the total hydrogen available from the decaborane if the reaction is carefully carried out.

When somewhat more than two gram-atoms of sodium per gram mole of decaborane are taken, the solution retains the blue color characteristic of sodium-liquid ammonia solutions even though long periods are allowed for the reaction; no decaborane can be recovered from the reaction products. However, when less than this amount of sodium is taken, the blue color of the solution is rapidly discharged and unreacted decaborane can be separated from the reaction products by extraction with n-hexane. In a typical experiment 62 percent of the excess was recovered (identified by M.P. 97–99°); and the residue was completely soluble in tetrahydrofuran. By comparison of the data of columns 5 and 6, Table II, it is evident that the reacting ratio of sodium to decaborane is 2.0.

In experiments using an excess of sodium the tetrahydrofuran-insoluble metallic residue which remained after recovery of the product was reacted with methanol, and the hydrogen gas produced was measured. This amount of hydrogen was taken as equivalent to the excess sodium. The methanol solution was distilled into dilute aqueous acid and it was demonstrated that the solution contained a negligible amount of boron. Thus, all the boron was present in the tetrahydrofuran-soluble material.

The boron-containing solid material $Na_2B_{10}H_{14}$ produced by practicing the method of this invention can be employed as an ingredient of solid propellant compositions in accordance with general procedures which are well-understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing sodium decaborane, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant proper proportions of finely divided oxidizer and finely divided $Na_2B_{10}H_{14}$ can be admixed with a high solids content solution of a partially condensed urea-formaldehyde or phenol-formaldehyde resin, the proportions being such that the amount of the resin is about 5 to 10 percent by weight, based upon the weight of the oxidizer and $Na_2B_{10}H_{14}$. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

We claim:
1. A method for the preparation of sodium decaborane of the formula $Na_2B_{10}H_{14}$ which comprises reacting two moles of sodium metal and one mole of decaborane at a temperature of from −60° C. to +40° C. while the reactants are dissolved in liquid ammonia, and thereafter recovering sodium decaborane from the reaction mixture.

2. Sodium decaborane of the formula $Na_2B_{10}H_{14}$.

References Cited in the file of this patent

Stock et al.: "Z. für Anorganische und allgemeine Chemie," vol. 228, pp. 178–192 (1936).

Schechter et al.: "Boron Hydrides and Related Compounds," January 8, 1951, page 37. Bureau of Naval Aeronautics, Department of Navy.